June 12, 1934.    F. J. EULER    1,962,812
COMBINED MEASURING AND DISPENSING CLOSURE FOR COFFEE CONTAINERS AND THE LIKE
Filed May 4, 1932
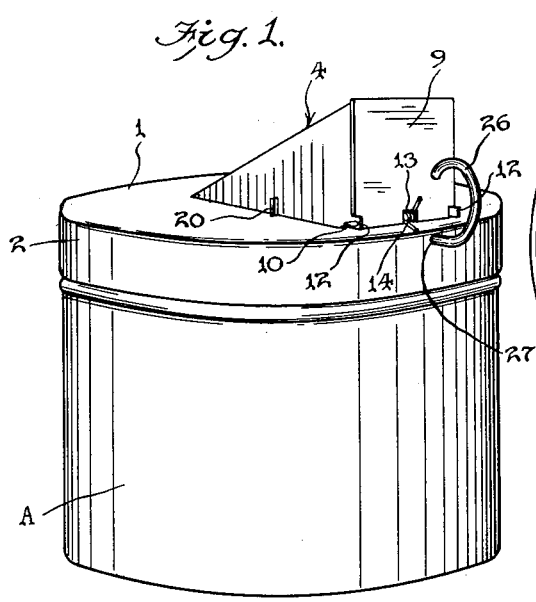
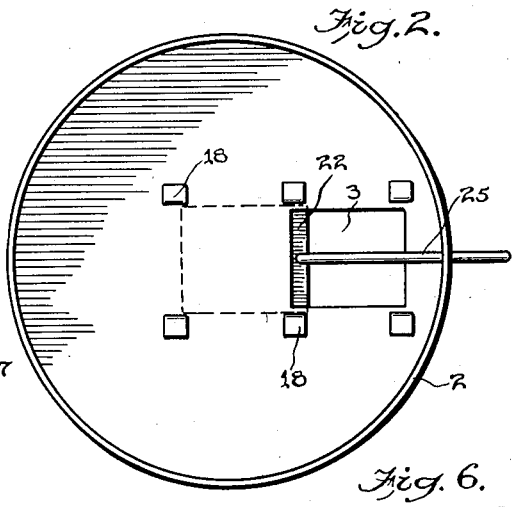
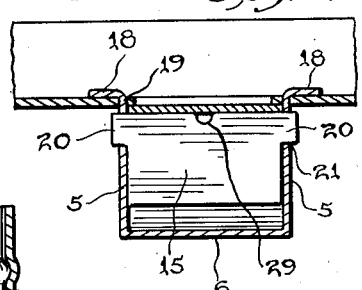
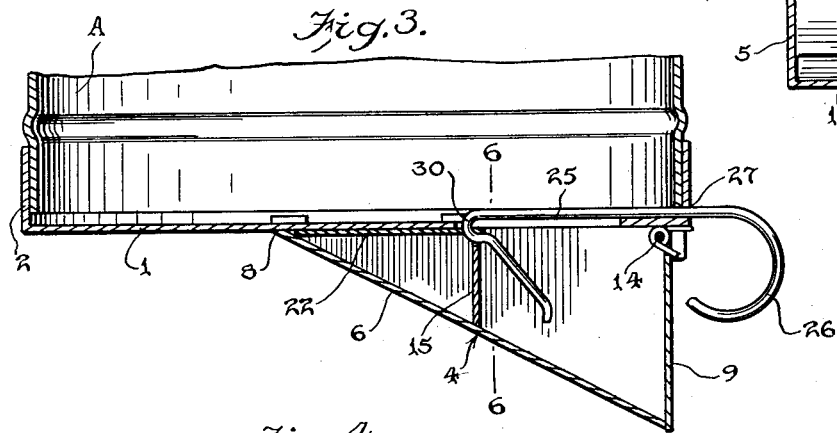
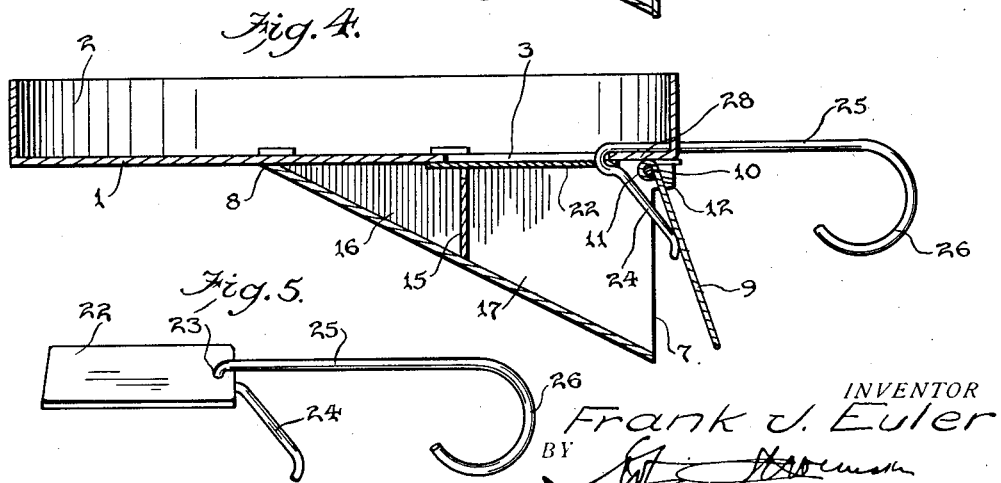
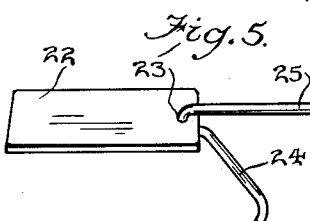
INVENTOR
Frank J. Euler
BY
his ATTORNEY Patented June 12, 1934

1,962,812

UNITED STATES PATENT OFFICE 1,962,812

COMBINED MEASURING AND DISPENSING CLOSURE FOR COFFEE CONTAINERS AND THE LIKE

Frank J. Euler, Rochester, N. Y.

Application May 4, 1932, Serial No. 609,315

8 Claims. (Cl. 221—112)

This invention relates to a combined measuring and dispensing closure for containers and more particularly, for containers for coffee and like granular or pulverized materials.

Granular materials such as coffee and the like are purchaseable in round, tin containers. These containers are provided in some instances with a slip-type closure and in other instances with a vacuum-sealed closure. When the user desires to remove coffee from the container, it is necessary to remove the entire closure. It is well known that when coffee is exposed to the atmosphere, it loses some of its desired inherent qualities. Within the purview of the present invention and according to one aspect thereof, the combined measuring and dispensing closure is embodied in a cover or closure structure which is placed on the coffee or like container immediately upon removing the original closure as supplied with the container. It is unnecessary to remove the closure of the present invention until the entire contents of the container have been used.

The primary object of the invention is to provide a measuring and dispensing mechanism for coffee and like containers which may be embodied in and made a part of any suitable section of the container structure, and in the form of the invention as illustrated it is embodied in and made a part of a closure or cover element for the container body and the cover or closure is constructed so as to be placed on conventional coffee containers after removal of the original top of the container as supplied to the purchaser.

Another object of the invention is to provide a measuring and dispensing closure top for containers which will enable the contents of the container to be measured and dispensed in predetermined amounts from within the container without removing the closure top.

Another object of the invention is to provide a combined measuring and dispensing closure top which is adaptable for use in connection with conventional coffee containers having the usual slip-type closure or a vacuum sealed or other closures.

A further object of the invention is to provide a measuring and dispensing mechanism which may be readily applied to or embodied in a conventional coffee or like container and which is of simple design and inexpensive of manufacture, yet, capable of long, durable service.

With these and other objects in view, the invention consists in the novel construction, combination and arrangement of parts hereinafter fully described, illustrated in the accompanying drawing, and pointed out in the claims hereto appended, it being understood that various changes in the form, proportion, and minor details of construction, within the scope of the claims, may be resorted to without departing from the spirit or sacrificing any of the advantages of the invention.

The invention will be more readily understood by referring to the annexed drawing, wherein:

Fig. 1 is a perspective view of a coffee or like container with my improved measuring and dispensing top or closure applied thereto.

Fig. 2 is a bottom plan view of the closure.

Fig. 3 is a fragmentary, vertical, sectional view showing a portion of the container with the improved measuring and dispensing closure applied thereto, the container being in an inverted position.

Fig. 4 is a vertical, sectional view showing the operation of closing the opening in the closure and operating the closure for the dispensing casing.

Fig. 5 is a perspective view showing the valve and operating bar.

Fig. 6 is a vertical, sectional view on the line 6—6 of Fig. 3.

Referring more particularly to the drawing, a conventional coffee or like container is designated by A. A slip-type closure 1 having a circumferential flange 2 is provided with a rectangular opening 3 on the top thereof adjacent the circumferential flange 2. The closure 1 may be considered as a part or important member of the container or container structure A. A substantially triangular-shaped casing 4 is disposed over the opening 3 on the outer side of the closure 1. This casing consists of inclined or tapering side walls 5 and an inclined wall 6. The front of the casing is open and adjacent the periphery of the closure 1, as denoted at 7. The open portion denoted at 7 at the front of the casing provides a discharge opening which is defined as to its sides by the forward edge of the vertical walls 5 and by the horizontally extending lower forward edge of the wall 6, that is to say, when the parts occupy the position shown in Fig. 3. In said Fig. 3 it will be noted that the wall 6 is upwardly inclined from the open front 7 to a point 8 and the casing which includes the vertical walls 5 and the inclined wall portion 6 may be referred to, and in fact sometimes is referred to herein, as the pouring spout or pouring spout casing. According to the present invention there is employed a closure member or delivery 9 which is normally relied upon to close the delivery end of the pouring spout. The closure or door 9 is pivotally mounted by means of a pintle 10 which extends through an overturned upper portion 11 of the closure 9. When the measuring and dispensing mechanism is in normal position for use as shown in Figs. 3 and 4 it will be noted that the closure or door 9 is pivoted from its upper portion and that movement to open position involves a forward outward movement of the lowermost edge of the door. The pintle also extends through openings in forwardly projecting ears 12 at the lower portions of each of the side walls. The closure 9 has a cut-away portion 13 intermediate its sides. A coiled spring 14 is positioned on the pintle 10 and is arranged in the opening 13 and one end thereof engages the top of the closure and the other end engages the door 9, thereby maintaining the door or closure 9 normally in a closed position. A transverse partition 15 is arranged within the casing 4 intermediate the point of inclination 8 of the walls thereof and the open front 7, thereby dividing the interior of the casing into two compartments, 16 and 17, respectively and into the latter of which compartments the coffee or other goods to be dispensed are intermediately received prior to delivery from the pouring spout through the discharge opening normally closed by the door or closure 9.

The casing 4 may be attached in any suitable manner to the closure 1 or to any other part of the container structure from and through which part material to be measured and dispensed is to pass and one embodiment of the attaching means, as shown in the drawing, consists of bendable ears 18 depending from and preferably integral with the walls 5. These ears pass through openings 19 formed in the closure 1, or other member of the container or container structure, and are bent over to secure the casing 4 to the closure as shown in Figure 6. Any suitable number of ears and openings may be provided as occasion demands. The transverse partition 15 is attached to and is in engagement with the side walls 5 by means of laterally extending projections 20 which pass through suitable openings 21 in the side walls 5. One end of the transverse partition engages the inclined wall 6, and the other end is spaced from the top of the closure 1 to permit of sliding movement of a flat, rectangular slide valve 22. This valve is provided at one end with an opening or perforation 23 through which is inserted the retrorsely bent inner end 24 of an operating bar 25 so that the bight portion of the retrorsely bent inner end engages the perforated portion of the valve. The outer end of the operating bar is provided with a curved finger-piece 26 serving as an operating handle therefor. A portion of the operating bar 25 and the finger-piece 26 extends exteriorly of the casing 4 through an opening or perforation 27 in the circumferential flange 2 of the closure 1 or as otherwise expressed through an opening 27 in a member or part of the container structure. The valve 22 is arranged and slides on and between the top of the closure 1 and the transverse partition 15 and the operating bar 25 engages and slides on a portion of the container structure, to-wit, in the form shown on a portion 28 of the closure 1 and which portion 28 is adjacent the opening 3. The transverse partition 15 may be notched as at 29 to receive the bight portion 30 of the operating rod when the slide valve 22 is positioned in the compartment 16. Fig. 3 shows the positions which the slide valve 22 and the swinging gate or door 9 normally occupy prior to being moved by the common operating rod 25 therefore permitting a discharge of the measured quantity of material, and which discharge takes place when the box occupies the position shown in Fig. 4.

It will be seen by referring to Figure 3, that the valve 22 is normally positioned or stored in the compartment 16. The pouring spout casing 4 is bottomless or in other words the compartment 17 of the casing 4 is normally in registry with the main interior of the container structure through the opening 3 in the closure 1. The opening 3 may be referred to as the intermediate opening that is normally open whereby the interior of the pouring spout casing and the main interior or storage space of the container casing or container structure are normally in direct communication with each other. This opening 3 may also be referred to as the slide-way valve controlled opening. The compartment 16 is disposed to one side of the opening 3 and, as before stated, serves to receive and normally store the slide valve 22 therein. When the container is inverted, as shown in Figure 3, the contents thereof will flow unrestrictedly into the compartment 17 through the opening 3, filling the said compartment and then by withdrawing the operating rod 25 outwardly of the container, the valve 22 will slide on the transverse partition 15 and close the opening 3, and the operating rod 25 will slide on the portion 28 of the closure 1 and simultaneously therewith, the retrorsely bent end 24 of the operating rod will engage the inner side of the door or closure 9 and open the same, as shown in Figure 4, and the contents from within the compartment 17 will be dispensed by gravity from the inclined wall 6 of the casing which forms a pouring spout along with the side walls 5 of the casing. The sliding movement of the valve 22 will cut through the contents of the container at the opening 3 without creating a binding action or preventing free and easy movement of the valve and the operating rod, which rod subsequently causes the opening of the door or closure 9 by means of the retrorsely bent end 24.

Upon releasing or moving the operating rod 25 inwardly from the position shown in Figure 4, it will be understood that the door or closure 9 will immediately close the opening 7 by means of the coiled spring 14.

After the closure of my invention has been applied to a suitable container, it will be simply necessary to invert the container and by withdrawing the operating rod 25 by means of the finger-piece 26, a measured predetermined amount of coffee will be dispensed from within the compartment 17 directly into a percolator or the like. While the drawing shows a slip-type closure, it will be understood that the circumferential flange 2 may be provided with screw threads or other securing means adaptable for engagement with similarly formed co-operable means on the container. The closure of the present invention will, of course, be of such dimensions and configuration as to conform to and with the type of container to which it may be applied.

What I claim as my invention is:

1. A measuring and dispensing closure for a container comprising a substantially triangular-shaped casing forming a pouring spout and having an inclined discharge wall and a discharge opening, the bottom of the casing being open and registering with an opening in the closure, a normally closed spring pressed pivoted closure for the discharge opening, and a retrorsely bent operating rod operable exteriorly of and extending within the casing to open the pivoted closure and discharge the contents from within the casing when the container has been inverted.

2. A measuring and dispensing closure for a container comprising a substantially triangular-shaped casing forming a pouring spout and having an inclined discharge wall and a discharge opening, the bottom of the casing being open and registering with an opening in the closure, a normally closed spring pressed pivoted closure for the discharge opening, a normally open slidable valve arranged between the casing and closure top for opening and closing the opening in the closure, and a retrorsely bent operating rod connected at its bight portion to the valve within the closure and casing and extending exteriorly thereof, whereby when the container is inverted, the contents therein will flow into the casing and be discharged therefrom on the inclined wall simultaneously with the closing of the valve over the openings and the engagement of the retrorsely bent end of the operating rod with the pivoted closure to open the latter.

3. A measuring and dispensing closure for a container comprising a substantially triangular-shaped casing forming a pouring spout and having an inclined discharge wall and a discharge opening, the bottom of the casing being open and registering with an opening in the closure, a transverse partition in the casing forming two compartments, one of which has no opening and forms a storage compartment, a normally closed spring pressed pivoted closure for the discharge opening, a flat valve slidable on said partition arranged between the casing and the closure top and normally resting in the said storage compartment, and a retrorsely bent operating rod connected at its bight portion to the valve within the closure and casing and having an end extending exteriorly of the closure, whereby when the container is inverted, the contents therein will flow into the other compartment and be discharged therefrom on the inclined wall simultaneously with the withdrawal of the valve from the storage compartment over the openings and the engagement of the retrorsely bent end of the operating rod with the pivoted closure to open the latter.

4. A measuring and dispensing device for a container comprising a casing extending transversely of one of the container from one side thereof and provided at such side with a lateral discharge opening, said casing having an inclined wall extending to the discharge opening for discharging material through the same, an outwardly opening normally closed hinged closure for the discharge opening, a normally open slide for controlling the flow of material from the container to the said casing, and exteriorly operable means for moving the slide to its closed position and for simultaneously opening the hinged closure.

5. A measuring and dispensing device for a container comprising a substantially triangular shaped casing located at one end of the container and extending inwardly transversely from one of the sides of the container and provided at such side with a lateral discharge opening, said container having an inclined discharge wall extending to the said lateral opening for directing material to the same, an outwardly opening hinged closure normally closing the lateral discharge opening of the casing, a normally open slide for controlling the flow of material to the casing, and exteriorly operable means for moving the slide to its closed position and for simultaneously opening the hinged closure.

6. A measuring and dispensing device having a suitable container structure and measuring and dispensing mechanism associated therewith, which mechanism comprises a casing forming a pouring spout having an inclined discharge wall and constructed so as to provide a discharge opening at the lower forward end of the spout and which casing is connected with the container structure and is normally closed at its forward or spout delivery end but is connected to the casing structure in the vicinity of a member having an intermediate opening or hole therethrough that is normally open whereby the interior of the pouring spout casing and the interior of the casing structure are normally in communication with each other through said intermediate opening, a normally closed pivoted door or closure located at and for the discharge end of the spout or casing, a slide valve normally away from closing position but arranged in association with that portion of the casing structure wherein the intermediate opening is provided that is normally left open, and an operating rod that extends from within the casing to the exterior of the container structure, the outer end of which rod provides an operating handle therefor and the inner end of which rod is retrorsely bent, the bight portioin of which retrorsely bent inner end arranged so as to engage and thereby operate the slide valve in a manner whereby longitudinal movement of the rod effects a movement of the slide valve to a position in which it effects a closing of said intermediate opening, the inner end of said retrorsely bent inner end also being constructed so as to provide a projecting portion which is arranged so that upon sufficient longitudinal movement of the operating rod said projecting inner end portion engages the pivoted closure and effects a movement of the pivot closure from its normal closed position to open position.

7. A container structure having a measuring and dispensing mechanism associated therewith and comprising in combination a casing forming a pouring spout having an inclined discharge wall and constructed so as to provide a discharge opening at the lower forward end thereof, which casing is normally closed at its forward delivery end and is connected to a member of the casing structure in the vicinity of an intermediate opening or hole that is normally open whereby the interior of the pouring spout casing and the interior or holding space of the container structure are normally in communication with each other through said intermediate opening, a normally closed pivoted door or closure located at and for the discharge end of the pouring spout or casing, a slide valve normally away from closing position but arranged in association with that portion of the container structure wherein the intermediate opening is provided that is normally left open, and an operating rod that extends from within the container structure to the exterior thereof, the outer portion of which rod provides an operating handle therefor, the inner portion of which rod is retrorsely bent, the inner portion of which rod is constructed and arranged so as to engage and thereby operate the slide valve in a manner whereby upon a certain longitudinal movement of the rod there will be effected a movement of the slide valve to a position in which there will be effected a closing of said intermediate opening, the inner end of said rod also being constructed so that a projecting end of the retrorsely bent portion will upon sufficient longitudinal movement of the operating rod engage the pivoted closure and will also effect a movement of the pivot closure from its normal closed position to open position.

8. A dispensing receptacle having a measuring chamber provided with an inlet and an outlet; closure members, one for the inlet and one for the outlet; means for moving the inlet closure member to closed position; and a lost motion operative connection between the closure members by which the outlet closure member is moved to open position during the last portion of the aforestated movement of the inlet closure member.

FRANK J. EULER.